Patented Oct. 27, 1931

1,829,502

UNITED STATES PATENT OFFICE

WILLIAM S. CALCOTT, OF PENNSGROVE, FREDERICK B. DOWNING, OF CARNEYS POINT, AND DONALD H. POWERS, OF PENNSGROVE, NEW JERSEY, ASSIGNORS TO E. I. DU PONT DE NEMOURS & COMPANY, OF WILMINGTON, DELAWARE, A CORPORATION OF DELAWARE

RUBBER-LIKE PRODUCT AND PROCESS OF MAKING SAME

No Drawing. Application filed August 12, 1927, Serial No. 212,608. Renewed June 13, 1931.

This invention relates to the manufacture of synthetic materials resembling rubber in their physical properties, and more particularly to such materials as may be prepared from certain hydrocarbons obtained from acetylene by a process of polymerization.

Much work has been done in the past on the synthesis of rubber-like materials by the polymerization of hydrocarbons. This work generally involved the preparation of a hydrocarbon containing the skeleton of four conjugated carbon atoms characteristic of the natural rubber hydrocarbon as isoprene, butadiene, or methylisoprene and the polymerization of the selected hydrocarbon, with or without the aid of catalysts and with or without heat. The resulting products were at once expensive and wholly unsuitable for soft rubber substitutes, though satisfactory to a certain extent for hard rubber. Synthetic rubber therefore never reached the commercial stage except for a brief period during the recent war, the material being unsatisfactory as regards both properties and price.

The object of this invention is to produce synthetic or partially synthetic rubber-like materials of sufficiently low price and high quality to be marketable.

The advantages of the new products over those obtained by prior methods are numerous and remarkable. While the prior methods gave products of little elasticity, difficult or impossible to mill, curable to hard rubber with difficulty, and entirely unsuitable for soft rubbers, the present process gives a product of high elasticity, easily milled and workable by the usual methods and machinery used for natural rubber, and suitable for the soft or elastic type of rubber goods as well as the hard. Chemically, the product differs from the materials previously produced in that it contains a different hydrocarbon or hydrocarbons; physically, in that it possesses a definite structure resembling that of rubber instead of being merely a colloidal solution of polymers in each other. The process also represents a fundamental improvement over the prior art as regards the number of steps between the raw material and finished article. No oxygen or other functional derivatives of the raw material are prepared; the raw material, acetylene, is merely polymerized, brought into the right physical condition (with or without partial reduction) and repolymerized, thus eliminating the laborious and expensive chemical reactions of the prior art.

These objects are accomplished by the utilization of the relatively cheap and abundant hydrocarbon, acetylene, and its conversion by a few simple steps into products possessing a structure closely similar to that of rubber and hence possessing closely similar physical properties. A product of high quality is attained by the development of such a structure. A suitable process for producing the rubber-like product of the invention from acetylene will be briefly outlined first and the individual steps will be discussed in more detail thereafter.

In general the acetylene is first treated to effect its polymerization and obtain a hydrocarbon of the desired type, as divinylacetylene. This hydrocarbon is thoroughly emulsified with water or other suitable emulsifying liquid and certain important accessory substances, to be described more particularly hereinafter, to an emulsion of grain size similar to that of natural Hevea latex or approximating a diameter of 1 micron. The emulsified hydrocarbon may then be repolymerized under conditions explained in detail below, said conditions being adapted to establish the maximum strength and elasticity of the coagulum to be obtained later. The resulting emulsion of polymerized hydrocarbon is then coagulated by any of the methods ordinarily employed for the coagulation of natural latex. After drying, milling and curing by the known methods, rubber-like bodies are obtained, the precise properties varying with the nature of the hydrocarbon used, the degree and manner of polymerization, and the nature and amount of the accessory substances added during emulsification, etc.

The various steps which go to make up the complete process will now be discussed in detail. It is to be understood however that the invention is not limited to the preferred method described hereinafter but contemplates all products of polymerizable hydrocarbons that are derived from acetylene by polymerization, which products come within the scope of the hereto appended claims.

The first step is the preparation from acetylene, of the higher boiling polymers. The method of producing these polymers, however, is not a part of this invention but is the subject of separate patent applications. In a preferred form of this reaction, polymerization is carried out by treating a suspension of cuprous chloride and ammonium chloride in water at about 25° C. with acetylene and distilling off the resulting product. Any cuprous salt, however, for example, copper sulphate, may be used instead of the mixture of cuprous chloride and ammonium chloride, the essential requirement being that at least a small amount of the cuprous salt be in solution, and that the reaction mass should possess an acid or neutral, but not an alkaline, reaction. These polymers of acetylene may be recovered from the catalyst by several methods, as for instance by decomposing the complexes formed by means of acids, cyanides, or ammonia, or by simply heating and distilling off the polymers at atmospheric or reduced pressure, or by solvent extraction, or other obvious methods. In the preferred method given, the polymer resulting is chiefly divinylacetylene, having the structural formula $H_2C=CH-C\equiv C-HC=CH_2$, but other polymers may be, and probably are, formed under different conditions. Evidence of the existence of one of these, methylene pentamethylene, has been found, and others might be shown to exist, but the precise structure of these hydrocarbons is immaterial for the purposes of this invention.

The hydrocarbon or hydrocarbon mixture thus obtained is a volatile liquid, polymerizing very rapidly under ordinary conditions to a viscous liquid and subsequently to a gelatinous or resinous solid, the latter being a violent explosive substance. The polymerization and development of explosive properties can be held in check by the exclusion of air or by the use of antioxidants, those suitable for rubber, for instance, hydroquinone, acet-aldehyde aniline and phenyl alpha naphthylamine, being also suitable for the use here. The stabilization by means of antioxidants, however, forms no inherent part of this invention, and is the subject of separate patent applications.

The acetylene polymer obtained as described above is ready for emulsification. It is thoroughly emulsified with water, using a mixture of a suitable protective colloid and an emulsifying agent, with or without antioxidant and accelerator. As suitable emulsifying agents, in general those used for the emulsification of oils with water may be used. Gelatine, glue, casein, Turkey red oil, Twitchell's reagent, the "sulphonic acids" obtained by the treatment of petroleum with sulphuric acid, etc. may be employed among others. As protective agents, glue, gelatine, casein, shellac, agar-agar, or in general water or alkali soluble proteins or resins may be employed. The organic acids may also be added, in the form of salts. Obviously, also, a single compound, for example, a hydrophilic protein such as egg albumen, may be added which functions at once both as an emulsifying agent and a protective colloid. Water soluble proteins when used may function also as collecting agents and thereby much simplify subsequent operations by eliminating the necessity of mechanical collection or aggregation of the precipitate or coagulum.

The precise means of emulsifying the hydrocarbon and the precise nature of the protective colloid and emulsifying agents employed are no essential part of this invention but are the subjects of separate patent applications.

To produce the emulsion the constituents may be violently agitated with water and certain important accessory substances, to be described more particularly hereinafter, to an emulsion of grain size similar to that of natural Hevea-latex, that is, until the grain size approximates a diameter of 1 micron. Substantial deviation from either direction of this particle size will materially reduce the tensile strength and elasticity of the final synthetic product. It is obviously desirable therefore to hold the particles as closely as possible to an average of 1 micron and, also, that the deviation from the average be as small as possible or, in other words, that the percentage of disproportionately large or small particles be held very low. Any well known emulsifying means or any stirring apparatus adapted to rotate at high speed may, obviously, be employed.

In addition to the emulsifying substances and protective agents used for the preparation and stabilization of the emulsion of the hydrocarbon, to build up the desired rubber-like structure, it is desirable to add a water insoluble resinous body of a relatively soft and plastic or viscous nature, which body must be chemically of such a type as to remain substantially unaltered during the emulsification, polymerization, and subsequent coagulation. As the process of the invention involves a change from slightly alkaline to slightly acid conditions the resin must be substantially unaffected in its physical properties by low concentrations of either acid or alkali and must remain in substantially the same physical state in the pH range 3 to 10 in the presence of water. Typical resins possessing these properties are those obtained from guayule or Hevea rubber by extraction with acetone. The addition of a resinous constituent of this type is a very important step as its presence confers the desired plasticity or viscosity in the external or continuous phase and is also essential to the development of the strength and elasticity of the finished product. The resinous constituent, in the form of an aqueous emulsion or suspension, may be added to the emulsion before polymerization or at any subsequent point up to the coagulation, but must be present before coagulation is carried out. Obviously substances other than water insoluble resins as guayule resin, which substances are soluble in water or very weakly alkaline aqueous solutions and are precipitated under the conditions of coagulation in the form of soft resinous bodies having properties similar to the water insoluble resins, for example, shellac, would be satisfactory for this purpose and may be substituted for the water insoluble resins.

Moreover, instead of using definite isolated resins such as the guayule resin particularly referred to, the hydrocarbon emulsion can be mixed prior to coagulation with a small quantity of natural latex or with the serum obtained upon coagulation of latex. Under these conditions a certain amount of the water soluble constituents which normally go to waste in the natural rubber serum is taken up and utilized by the hydrocarbon of the synthetic emulsion. It is preferable in this case to add a small quantity of an isolated resin which will still further improve the quality of the finished product. Where the term "resinous substance" or "resinous constituent" is employed hereinafter, it is to be understood to refer generically to isolated amorphous bodies of ill defined or indefinite melting point which bodies are of the type described above, including substances which will be precipitated in the form of such amorphous bodies under the conditions of coagulation, as well as to mixtures containing such resins in unisolated form.

Since the hydrocarbons involved in the process are highly unsaturated and consequently highly susceptible to oxidation, it is desirable, if this has not already been done, to also incorporate in the emulsion one of the well-known rubber antioxidants in order to preclude oxidation of the coagulum to be obtained. It is also desirable, although not essential, to incorporate one of the rubber vulcanization accelerators, although this is of very minor importance as compared with the other substances. The amount of such substances to be employed will of course be varied according to the substances employed.

Before emulsification the hydrocarbon mixture or the divinylacetylene obtained from the treatment of the acetylene with cuprous salts may, if desired, be partially repolymerized and the repolymerization carried on to the desired point subsequent to emulsification. Alternatively, the hydrocarbon may be emulsified without substantial repolymerization and all the desired repolymerization carried out subsequently. Repolymerization may be carried out by simply allowing the hydrocarbon or emulsified hydrocarbon to stand at ordinary temperature in the presence of oxygen and may be accelerated by heating alone or in the presence of catalysts such as oxidizing agents or aromatic sulphonic acids. The reaction may be controlled by adding antioxidants suitable for use with rubber as, for example, hydroquinone, acetaldehyde aniline and phenyl alpha naphthylamine, if desired.

Divinylacetylene polymerizes very rapidly under the influence of heat, with or without catalysts. It may be polymerized at temperatures of 20° to 150° C., the complete reaction requiring several months at the lower temperature and being substantially instantaneous at the higher. The reaction is catalyzed by oxidizing agents, such as air, peroxides, per-salts, and by acids, especially water or hydrocarbon soluble acids such as acetic, formic, benzene sulphonic acid, phenol sulphonic acid, the "sludge acids" referred to in Example 2—a, etc. Any of these materials may be used as catalysts for the polymerization of divinylacetylene either in pure state or in the form of the emulsions referred to. In case the acids are used for catalysts in the emulsion polymerization, the pH value of the emulsion must be kept high enough to prevent acid coagulation of the emulsion (approximately, between pH 7.0 and pH 3.0). The particular manner and conditions employed for effecting this final polymerization are not of primary importance for the purposes of the present invention.

After the polymerization of the emulsified hydrocarbon has reached the desired stage, which may be determined by its solubility in alcohol, the emulsion prior to coagulation strikingly resembles natural latex in its physical structure and properties. It is a two phase system containing hydrocarbon droplets as the disperse phase. The droplets of polymerized hydrocarbon are of uniform size approximating a diameter of 1 micron and are suspended in a continuous phase comprising, like natural latex, a resinous constituent. Due to the polymerization of the hydrocarbon in an emulsified state these droplets are made up of hydrocarbon spheroids encased in a layer of more viscous and more highly polymerized hydrocarbon.

The synthetic latex is coagulated by any of the methods commonly used for the coagulation of natural latex, for example, it may be acidified, treated with a solvent such as alcohol, and coagulated with metallic salts or by fermentation. Alternatively, it may be stabilized by well-known methods for stabilizing natural latex or the rubber-like materials present may be recovered by evaporating off the water.

The resulting coagulum will vary in properties in accordance with the optional method used for its preparation, as well as with the extent to which the hydrocarbon has been polymerized before coagulation. Roughly, the fresh coagulum varies from the consistency of badly swelled freshly coagulated latex to that of normal coagulated latex, while after drying it varies from softened crepe rubber to normal crepe rubber, while under polymerization will give a product resembling over-milled crepe.

If desired, the coagulum may be sheeted, and an antioxidant incorporated during the sheeting. Alternatively, it may be dried in lumps or masses and not sheeted.

In order to better disclose the invention, specific examples of actual embodiments of the various steps are furnished below. In connection with these examples it is desired to again emphasize that they are merely illustrative of the preferred method and that it is not applicants' intention to be limited thereby to the particular conditions and steps therein set forth. The parts are given by weight.

*Example 1. Synthesis of divinylacetylene*

To 1000 g. of water are added 945 g. of ammonium chloride, 2850 g. of cuprous chloride, and 100 g. of copper, the function of the latter being merely to reduce any cupric copper present to the cuprous state. Acetylene is then passed into this mixture till the absorption begins to slow down markedly. The temperature may be permitted to rise without causing trouble, but it is preferable to hold it down to 25° C. or thereabouts. When the reaction slows up, as shown by the decreased rate of absorption, the gas is shut off, and the polymerized acetylene obtained by distillation. A mixture consisting chiefly of water and divinylacetylene is obtained by this procedure, the main reaction being substantially as follows:

Sodium, potassium, or other alkali chlorides may be substituted for the ammonium chloride of the above formula, and other cuprous salts (as for instance, the sulphate) for the cuprous chloride. In case of substituting other cuprous salts for the chloride, it is preferable to use alkali salts containing the same anion as the cuprous salt, and to maintain an acidity sufficient to ensure the formation of some cuprous salt. With cuprous sulphate, for instance, 80% sulphuric acid may be used, together with ammonium sulphate. In general the essential condition is that the cuprous salt must be present in a neutral or acid medium in both the liquid and the solid phases. Otherwise, temperature, concentration, acidity, the nature of the anion, etc., may be allowed to vary widely. As cupric salts in the presence of only traces of cuprous salts are rapidly reduced by acetylene, any mixture of cuprous or cupric salts may be used instead of the pure cuprous salt, the first product being then contaminated with other derivatives of acetylene; e. g., in the specific case given, if a mixture of 99% cupric chloride and 1% cuprous chloride were substituted for the cuprous chloride, the product of the first treatment with acetylene would consist chiefly of dichlorethylene, obtained presumably as follows:

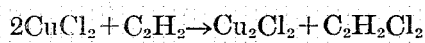

*Example 2. Preparation of divinylacetylene emulsions*

*a.* To a 1% solution of gelatine (protective colloid) in water there is added 1% of the so-called "sludge acids" obtained upon the treatment of petroleum with sulphuric acid. The oil soluble fraction is preferably employed, and in the form of the sodium soap. To 100 pts. of this mixture are added 30 pts. of divinylacetylene, and the whole is vigorously agitated. A milky emulsion results, having only a slight tendency to separate.

*b.* To 100 pts. of the serum remaining after the coagulation of rubber latex are added 1% ammonium oleate and 30 pts. of divinylacetylene. Upon vigorous agitation a milky emulsion is formed, having little tendency to separate.

*c.* To 100 pts. of rubber latex, containing approximately 30 pts. of rubber, are added 1 pt. sodium stearate and 60 pts. divinylacetylene. Upon vigorous agitation there results an emulsion having little more tendency to separate than the original latex.

Other emulsifying agents, such as Turkey red oil, Twitchell's reagent, etc. may be used instead of those named above. As protective colloids may be named gelatine, glue, casein, rubber latex serum, lysalbinates, protalbinates, albumen, tannin, glucose, and in general, water soluble proteins or protein like substances, sugars and other carbohydrates, tanning agents, water and alkali soluble resins such as shellac, rosin, gum tragacanth, etc. The properties of the emulsion naturally vary with the precise mixture employed, but in all cases after polymerization and coagulation a definitely structured rubber-like material is obtained.

*Example 3. Polymerization of divinylacetylene*

*a.* Divinylacetylene is allowed to stand, either unmixed or emulsified, at a temperature of 30° C. for one week. It will be found by the alcohol solubility test that approximately 25% of the hydrocarbon has become insoluble in alcohol, showing a considerable degree of polymerization.

b. Divinylacetylene is mixed with 25% glacial acetic acid and heated to 80° C. for one day. A resinous polymer, insoluble in alcohol, is obtained.

*Example 4. A complete example of the manufacture of raw rubber by the process follows*

To 100 pts. of divinylacetylene obtained by the polymerization of acetylene there are added 200 pts. of water, 2 pts. of naphthenic acid sodium salts, and 1 pt. of gelatin. The mixture is agitated violently until it is found upon microscopic examination that the average particle size is 1 micron and that disproportionably large or small particles are chiefly absent. With this emulsion there is then mixed 1 pt. of guayule resin in the form of an aqueous suspension. The mixture is then allowed to stand for 7 days at room temperature (25° C.) to polymerize and there is then added 1 pt. of Hevea latex, which is thoroughly incorporated by gentle agitation. Two-tenths of a part of hydroquinone in the form of an aqueous solution are added. The mixture is then coagulated by the addition of sufficient 2% acetic acid to change the pH of the solution to approximately 4. The coagulum thus obtained is freed from water by milling and is ready for use as raw rubber.

The finished product may be treated in the same general manner as raw natural rubber. It may be milled, the usual chemicals such as zinc oxide, sulfur, accelerators, carbon black, softeners, antioxidants, etc., incorporated. It can be cured, or vulcanized, by heat treatment applied in a manner similar to that used in curing natural rubber. It can also be cured with sulfur chloride, or, in general, by the methods and reagents used for natural rubber. The precise methods used form no part of this invention and are the subjects of separate patent applications. An illustrative curing method is given, however, in the following examples.

*Example 5. Vulcanization* a. The "synthetic divinylacetylene rubber" is broken down on the mill in the same manner as, for example, pale crepe rubber. To 100 pts. of the dry "rubber" are added 5 pts. zinc oxide, 5 pts. sulfur, 0.5 pt. morpholyl morpholine dithionate, and 1.0 pt. phenyl-a-naphthylamine, and the whole thoroughly milled. The resulting product is then cured 3 minutes at 140° C. There results an elastic body, possessing good tensile strength and elongation.

b. The "synthetic rubber" is treated with a carbon disulphide solution of sulfur chloride in the usual "cold cure" manner. Rapid but superficial curing takes place.

In general, any of the known methods of curing rubber can also be applied to these synthetic products, it being necessary, however, to adjust the time and temperature of cure to allow for the varying chemical reactivity of the hydrocarbons employed.

The material produced by this process can be readily distinguished from previously prepared synthetic rubbers, by the fact that the diffraction pattern, obtained upon taking an X-ray photograph of the stretched material, is closely similar to that obtained from natural rubber, and is that ordinarily considered characteristic of a crystalline body, whereas the corresponding photographs of the other "synthetic rubbers" are characteristic of an amorphous body. In our opinion, this diffraction pattern is not necessarily indicative of a crystalline substance, but only of a substance in which the molecules possess definite orientation, although it has been commonly accepted in the past as evidence of crystallinity.

According to our working hypothesis, the material produced by this process consists essentially of a 2-phase liquid system. The inner, or disperse, phase consists of small particles or globules, approximately one micron in diameter, composed of partially polymerized hydrocarbon, the degree of polymerization decreasing toward the center of the globules, or, in other words, the higher polymer tending to concentrate in the interface between the two phases. The external phase consists of a highly viscous liquid or plastic solid, completely filling the capillary spaces between the globules, and these spaces between globules at no point exceed capillary dimensions. The external phase may be composed either of a resin, a mixture of a resin with a higher polymer of the hydrocarbon, or of the higher polymer only, and it is not essential that there be a clean-cut sharp dividing line between the two phases.

As numerous optional methods and combinations exist, the physical properties of the finished product are subject to an equally wide number of variations. The fundamental property common to all of the products made according to the procedure described is that of elasticity to a marked degree, elongations of up to 800% having been obtained. The tensile strength varies with the precise mode of preparation, the hydrocarbon or hydrocarbons used, and the degree of polymerization. The other properties can also be varied widely by varying the factors just mentioned.

The materials prepared in accordance with the above description may be used as general substitutes for natural latex and natural rubber.

We claim:

1. In the process of making a rubber-like material the step which comprises polymerizing acetylene to a rubber-like body.

2. In the process of making a rubber-like material the step which comprises polymerizing divinylacetylene.

3. In the process of making a rubber-like material the steps which comprise polymerizing acetylene to produce a polymerizable hydrocarbon of higher molecular weight and repolymerizing said hydrocarbon.

4. The step in the process of making a rubber-like material which comprises forming an emulsion of a polymerizable acetylene polymer.

5. The step in the process of making a rubber-like hydrocarbon containing material which comprises forming an emulsion containing divinylacetylene.

6. The step in the process of making a rubber-like hydrocarbon containing material which comprises forming an aqueous emulsion of divinylacetylene.

7. The process of making a rubber-like hydrocarbon containing material which comprises the steps of forming an aqueous emulsion of divinylacetylene and polymerizing the emulsified divinylacetylene.

8. The process of making a rubber-like material which comprises coagulating an emulsion of a polymerized hydrocarbon, said hydrocarbon being a polymer of acetylene.

9. The process of making a rubber-like material which comprises coagulating an emulsion of polymerized divinylacetylene.

10. The process of making a rubber-like hydrocarbon containing material which comprises the steps of forming an aqueous emulsion of divinylacetylene and an accessory substance and polymerizing the emulsified divinylacetylene.

11. The process of making a latex-like liquid which comprises preparing an aqueous emulsion of divinylacetylene, said emulsion containing a resinous constituent.

12. The process of making a rubber-like material from a divinylacetylene which comprises coagulating an emulsion of polymerized divinylacetylene, said emulsion containing a resinous constituent.

13. The process of making a rubber-like material from a divinylacetylene which comprises coagulating an emulsion of polymerized divinylacetylene, said emulsion containing a resinous constituent and a water soluble protein.

14. The process of making a rubber-like material from divinylacetylene which comprises forming an aqueous emulsion of divinylacetylene, the emulsified particles of divinylacetylene being substantially the size of the particles present in Hevea latex, polymerizing the emulsified divinylacetylene and coagulating said emulsion.

15. The process of making a latex-like liquid which comprises preparing a mixture of a resinous constituent in an aqueous emulsion of divinylacetylene, the emulsified particles of divinylacetylene having a diameter of substantially 1 micron.

16. The process of making a rubber-like material which comprises forming an aqueous emulsion containing polymerized divinylacetylene, and a resinous substance in which emulsion the particles of divinylacetylene have substantially the size of the particles present in natural latex and coagulating.

17. The process of making a rubber-like material which comprises forming an aqueous emulsion containing divinylacetylene, a water soluble protein and a resinous substance in which emulsion the particles of divinylacetylene have substantially the size of the particles present in natural latex polymerizing the emulsified divinylacetylene and coagulating.

18. The process set forth in claim 16 in which the resinous substance comprises a mixture of guayule resin and natural latex.

19. The process of making a rubber-like material which comprises mixing divinylacetylene with water, an emulsifying agent and a protective colloid, agitating said mixture until the average particle size of the divinylacetylene is substantially 1 micron, incorporating with the resulting emulsion an aqueous suspension of a resinous constituent, effecting polymerization of the emulsified divinylacetylene, incorporating an antioxidant to effect stabilization and coagulating.

20. The process of making a rubber-like material which comprises the steps of polymerizing acetylene to produce a polymerizable hydrocarbon of higher molecular weight and repolymerizing said hydrocarbon under the influence of heat.

21. The process of making a rubber-like material which comprises the steps of polymerizing acetylene to produce a polymerizable hydrocarbon of higher molecular weight and repolymerizing said hydrocarbon under the influence of a water or hydrocarbon soluble acid.

22. The process of making a rubber-like material which comprises the steps of polymerizing acetylene to produce a polymerizable hydrocarbon of higher molecular weight and repolymerizing said hydrocarbon under the influence of heat and in the presence of an oxidizing catalyst.

23. The process of making a rubber-like material which comprises the steps of polymerizing acetylene to produce a polymerizable hydrocarbon of higher molecular weight and repolymerizing said hydrocarbon under the influence of heat and in the presence of a catalyst.

24. A rubber-like product obtained from a polymerizable polymer of acetylene.

25. A rubber-like product obtained from divinylacetylene.

26. A rubber-like product comprising a hydrocarbon containing the group: $C\equiv C$.

27. A rubber-like product comprising polymerized divinylacetylene.

28. A latex-like liquid comprising an emulsion of a hydrocarbon containing the group: $C\equiv C$.

29. A latex-like liquid comprising an emulsion of polymerized divinylacetylene.

30. A latex-like product comprising in an aqueous emulsion, as the disperse phase, a polymerizable acetylene polymer, the particles of said hydrocarbon being progressively less polymerized toward their interiors.

31. A latex-like liquid comprising an emulsion of polymerized divinylacetylene, in admixture with a resinous constituent.

32. A rubber-like product resulting from coagulating an emulsion of polymerized divinylacetylene, said emulsion containing a resinous constituent.

33. A rubber-like product resulting from coagulating an emulsion of polymerized divinylacetylene, said emulsion containing a resinous constituent and a water soluble protein.

34. A rubber-like product resulting from forming an aqueous emulsion containing a polymerizable hydrocarbon having the group $C\equiv C$, and a resinous substance, in which emulsion the particles of hydrocarbon have substantially the size of the particles present in natural latex, and coagulating.

35. A rubber-like product resulting from forming an aqueous emulsion containing a polymerizable hydrocarbon having the group $C\equiv C$, a water soluble protein, and a resinous substance, in which emulsion the particles of hydrocarbon have substantially the size of the particles present in natural latex, and coagulating.

36. A rubber-like product resulting from forming an aqueous emulsion containing divinylacetylene and a resinous substance comprising a mixture of guayule resin and natural latex, in which emulsion the particles of divinylacetylene have substantially the size of the particles present in natural latex, polymerizing the emulsified divinylacetylene and coagulating.

37. A rubber-like product comprising a 2-phase system, the disperse phase comprising particles of polymerized divinylacetylene, and the external phase comprising a viscous liquid or plastic solid.

38. The product set forth in claim 37 in which the external phase comprises a resinous constituent.

39. A synthetic rubber-like material comprising a polymerizable acetylene polymer and showing, under the X-ray, a diffraction pattern of the type ordinarily considered characteristic of a crystalline body.

40. A synthetic rubber-like material comprising a divinylacetylene polymer showing, under the X-ray, a diffraction pattern of the type ordinarily considered characteristic of a crystalline body.

41. A rubber-like product comprising a 2-phase system, the disperse phase comprising particles of polymerized divinylacetylene, the degree of polymerization decreasing toward the center of said particles, and the external phase comprising a viscous liquid or plastic solid.

42. A rubber-like product comprising a 2-phase system, the disperse phase comprising particles of a polymerizable acetylene polymer, the degree of polymerization decreasing toward the center of said particles, and the external phase comprising a viscous liquid or plastic solid said system showing, under the X-ray, a diffraction pattern of the type ordinarily considered characteristic of a crystalline body.

43. An aqueous emulsion of divinylacetylene containing a resinous constituent.

In testimony whereof we affix our signatures.

WILLIAM S. CALCOTT.
FREDERICK B. DOWNING.
DONALD H. POWERS.